US005876530A

United States Patent [19]

Seki et al.

[11] Patent Number: 5,876,530

[45] Date of Patent: Mar. 2, 1999

[54] METHOD AND APPARATUS FOR SINGLE FACER GLUE APPLICATION ADJUSTMENT

[75] Inventors: Yukuharu Seki; Makoto Ando; Takashi Nitta, all of Mihara, Japan

[73] Assignee: Mitsubishi Jukogyo Kabushiki Kaisha, Japan

[21] Appl. No.: 784,521

[22] Filed: Jan. 17, 1997

[30] Foreign Application Priority Data

Jan. 23, 1996 [JP] Japan .................................... 8-009175

[51] Int. Cl.[6] ............................... B32B 31/00; B31F 1/00

[52] U.S. Cl. ............................ 156/64; 156/205; 156/210; 156/356; 156/578; 118/258

[58] Field of Search .............................. 156/64, 205, 210, 156/356, 357, 378, 578; 118/248, 249, 258, 262, 672, 692

[56] References Cited

U.S. PATENT DOCUMENTS

| | | | |
|---|---|---|---|
| 3,046,935 | 7/1962 | Wilson . | |
| 4,549,924 | 10/1985 | Berthelot et al. . | |
| 5,348,612 | 9/1994 | Buetikofer et al. . | |
| 5,415,720 | 5/1995 | Schönhammer et al. . | |
| 5,434,027 | 7/1995 | Oshiba et al. | 430/59 |

FOREIGN PATENT DOCUMENTS

| | | |
|---|---|---|
| 0383414A1 | 8/1990 | European Pat. Off. . |
| 0536518A1 | 4/1993 | European Pat. Off. . |
| 0574874A1 | 12/1993 | European Pat. Off. . |
| 0601528 | 6/1994 | European Pat. Off. . |
| 0601528A1 | 6/1994 | European Pat. Off. . |
| 2540040A1 | 3/1984 | France . |
| 4305158A1 | 8/1994 | Germany . |
| 1138683 | 1/1969 | United Kingdom . |
| 1145533 | 3/1969 | United Kingdom . |
| 2095430 | 3/1981 | United Kingdom . |
| 2095430 | 9/1982 | United Kingdom . |

*Primary Examiner*—James Engel
*Attorney, Agent, or Firm*—Rothwell, Figg, Ernst & Kurz, p.c.

[57] ABSTRACT

A glue application roll 1 rotating at a circumferential velocity $v_1$ is moved to touch a downstream side corrugating roll (an upper corrugating roll) 9 rotating at a circumferential velocity $v_2$ via a core paper 11 and, in response to variation in vibration, noise, drive torque or pressing reaction force of the glue application roll 1 caused thereby, a setting position of the glue application roll 1 to the downstream side corrugating roll 9 is adjusted, thus a gap between the glue application roll 1 and the downstream side corrugating roll 9 is maintained approximately at a thickness of the core paper 11.

14 Claims, 6 Drawing Sheets

METHOD AND APPARATUS FOR SINGLE FACER GLUE APPLICATION ADJUSTMENT

BACKGROUND OF THE INVENTION

1. Field of the Invention

The present invention relates to a method and an apparatus for a single facer glue application adjustment in which a glue application roll is adjusted of its setting position based on a variation in vibration, noise, drive torque or pressing reaction force of the glue application roll.

2. Description of the Prior Art

A belt pressing type single facer in the prior art is described with reference to FIG. 5. Numeral 1 designates a glue application roll, numeral 3 designates a doctor roll, numeral 4 designates a glue tank forming a wall on one side by the glue application roll 1 and the doctor roll 3, numeral 2 designates a glue within the glue tank 4, numeral 7 designates a glue application portion unit supporting the glue application roll 1, the doctor roll 3 and the glue tank 4, numeral 9 designates a downstream side corrugating roll (an upper corrugating roll), numeral 12 designates an upstream side corrugating roll (a lower corrugating roll) contra-rotating in engagement with the downstream side corrugating roll 9, numeral 11 designates a core paper, numeral 15 designates an endless belt pressing touchingly the downstream side corrugating roll 9, numeral 13 designates a single faced corrugated board sheet, numeral 14 designates a liner, thus a glue application apparatus of a belt pressing type single facer is constructed by the glue application roll 1, the doctor roll 3 and the glue tank 4.

In the belt pressing type single facer in the prior art shown in FIG. 5, the core paper 11 is led between the upstream side corrugating roll 12 and the downstream side corrugating roll 9 engaging and contra-rotating each other to be corrugated into a wave-shaped state and then this core paper 11 is led between the glue application roll 1 and the downstream side corrugating roll 9.

Then, in the glue application apparatus, the glue 2 within the glue tank 4 is applied to the outer circumferential surface of the rotating glue application roll 1, is adjusted to form a glue film of a predetermined thickness by the doctor roll 3, is transferred rotatingly to the direction of the downstream side corrugating roll 9 and is coated on the tip portions of corrugations of the core paper 11.

Said core paper 11 and the liner 14 supplied via another route are led between the endless belt 15 and the downstream side corrugating roll 9 to be lapped each other and, with a predetermined pressing force P and temperature, the core paper 11 and the liner 14 are bonded by the glue 2 coated on the tip portions of corrugations of the core paper 11, thus the single faced corrugated board sheet 13 is produced.

FIG. 6 shows an example of a gap adjusting apparatus in the prior art for adjusting a gap between the downstream side corrugating roll 9 and the glue application roll 1. Numeral 16 designates a frame, numeral 27 designates a cylinder mounted on the frame 16 and a piston rod of the cylinder 27 is supported pivotally by the glue application portion unit 7.

Numeral 28 designates a positioning metal element fixed to the glue application portion unit 7, numeral 30 designates an eccentric shaft and numeral 29 designates a stopper supported by the eccentric shaft 30.

In the gap adjusting apparatus shown in FIG. 6 for adjusting the gap between the downstream side corrugating roll 9 and the glue application roll 1, the cylinder 27 is moved to the direction of elongation, the positioning metal element 28 is hit to the stopper 29, thus the gap between the downstream side corrugating roll 9 and the glue application roll 1 is set to a predetermined measure.

If the gap between the downstream side corrugating roll 9 and the glue application roll 1 is to be adjusted in the above-mentioned state, the eccentric shaft 30 is rotated, the stopper 29 is moved to the right or left in the figure, the positioning metal element 28 and the glue application portion unit 7 are moved in same direction and the gap between the downstream side corrugating roll 9 and the glue application roll 1 is finely adjusted.

Incidentally, as a roll gap adjusting apparatus not shown in the figure, there is one in which an insertion amount of a wedge-like element inserted between the stopper 29 and the positioning metal element 28 is changed, a stopping position of the glue application portion unit 7 is changed, thereby a gap between the downstream side corrugating roll 9 and the glue application roll 1 is adjusted.

FIG. 7 shows another example of a gap adjusting apparatus in the prior art for adjusting a gap between the downstream side corrugating roll 9 and the glue application roll 1. This roll gap adjusting apparatus is constructed so that the glue application portion unit 7 supporting the glue application roll 1, the doctor roll 3 and the glue tank 4 is moved up and down by a cylinder 21, thereby the glue application roll 1 and the downstream side corrugating roll 9 can make contact or separation each other, and at the stroke end position of the cylinder 21, the gap between the glue application roll 1 and the downstream side corrugating roll 9 is set at a predetermined measure corresponding to a thickness of the core paper 11.

The gap adjusting apparatus in the prior art shown in FIG. 6 is constructed so that the cylinder 27 is moved to the direction of elongation, the positioning metal element 28 is hit to the stopper 29, thus the gap between the downstream side corrugating roll 9 and the glue application roll 1 is set to a predetermined measure.

Further, the gap adjusting apparatus in the prior art shown in FIG. 7 is constructed so that the glue application portion unit 7 supporting the glue application roll 1, the doctor roll 3 and the glue tank 4 is moved up and down by the cylinder 21, thereby the glue application roll 1 and the downstream side corrugating roll 9 can make contact or separation each other, and at the stroke end position of the cylinder 21, the gap between the glue application roll 1 and the downstream side corrugating roll 9 is set at a predetermined measure corresponding to the thickness of the core paper 11.

Accordingly, in order to make a state of glue transfer uniform in a case of change of thickness of a core paper accompanying with change of orders, it is necessary to make the roll-gap adjustment manually at each time of change of orders, and moreover as the adjustment is troublesome and a long time is needed for re-setting, there is such a problem that an operation efficiency of a single facer is lowered.

Further, there are such shortcomings that due to negligence or failure of said re-setting, for example, in case of a changed core paper 11 becoming thicker, a pressing force acts on the core paper 11 so that the core paper 11 tears, or in case of a changed core paper 11 becoming thinner, the gap increases so that a glue transfer amount becomes less.

SUMMARY OF THE INVENTION

In view of the above-described problems in the prior art, it is an object of the present invention to provide a method and an apparatus for a single facer glue application adjustment by which 1 occurrence of defective sheet accompanying with operation mistake like negligence of setting change etc. can be prevented, 2 appearance of corrugated board sheet is improved and quality of strength etc. can be enhanced and 3 manufacturing cost of a glue application adjusting apparatus can be lowered.

In order to attain the above-mentioned objects, one feature of a single facer glue application adjusting method according to the present invention is that a glue application roll is rotated at a circumferential velocity different from or same as that of a downstream side corrugating roll; the glue application roll is moved toward the downstream side corrugating roll to touch the downstream side corrugating roll via a core paper; and when a vibration of the glue application roll varies, movement of the glue application roll is stopped so that a gap between the glue application roll and the downstream side corrugating roll is adjusted approximately to a thickness of the core paper.

Another feature of a single facer glue application adjusting method according to the present invention is that a glue application roll is rotated at a circumferential velocity different from or same as that of a downstream side corrugating roll; the glue application roll is moved toward the downstream side corrugating roll to touch the downstream side corrugating roll via a core paper; after a vibration of the glue application roll varies and comes to a predetermined value, the glue application roll is moved to the direction of separation from the downstream side corrugating roll; and when the vibration of the glue application roll returns to the value of the time immediately before the commencement of the variation, movement of the glue application roll is stopped so that a gap between the glue application roll and the downstream side corrugating roll is adjusted approximately to a thickness of the core paper.

And another feature of a single facer glue application adjusting apparatus according to the present invention is that it comprises a moving device to move a glue application roll to the direction of contact or separation relative to a downstream side corrugating roll, a detection device to detect a vibration of the glue application roll and a control device to control work of the moving device based on a detected signal from the detection device and is so constructed that a gap between the glue application roll and the downstream side corrugating roll can be adjusted approximately to a thickness of a core paper in response to variation in the vibration of the glue application roll.

Still another feature of a single facer glue application adjusting method according to the present invention is that a glue application roll is rotated at a circumferential velocity different from or same as that of a downstream side corrugating roll; the glue application roll is moved toward the downstream side corrugating roll to touch the downstream side corrugating roll via a core paper; and when a noise of the glue application roll varies, movement of the glue application roll is stopped so that a gap between the glue application roll and the downstream side corrugating roll is adjusted approximately to a thickness of the core paper.

Further, a feature of a single facer glue application adjusting method according to the present invention is that a glue application roll is rotated at a circumferential velocity different from or same as that of a downstream side corrugating roll; the glue application roll is moved toward the downstream side corrugating roll to touch the downstream side corrugating roll via a core paper; after a noise of the glue application roll varies and comes to a predetermined value, the glue application roll is moved to the direction of separation from the downstream side corrugating roll; and when the noise of the glue application roll returns to the value of the time immediately before the commencement of the variation, movement of the glue application roll is stopped so that a gap between the glue application roll and the downstream side corrugating roll is adjusted approximately to a thickness of the core paper.

And a feature of a single facer glue application adjusting apparatus according to the present invention is that it comprises a moving device to move a glue application roll to the direction of contact or separation relative to a downstream side corrugating roll, a detection device to detect a noise of the glue application roll and a control device to control work of the moving device based on a detected signal from the detection device and is so constructed that a gap between the glue application roll and the downstream side corrugating roll can be adjusted approximately to a thickness of a core paper in response to variation in the noise of the glue application roll.

Further feature of a single facer glue application adjusting method according to the present invention is that a glue application roll is rotated at a circumferential velocity different from that of a downstream side corrugating roll; the glue application roll is moved toward the downstream side corrugating roll to touch the downstream side corrugating roll via a core paper; and when a drive torque of the glue application roll varies, movement of said glue application roll is stopped so that a gap between the glue application roll and the downstream side corrugating roll is adjusted approximately to a thickness of the core paper.

Further feature of a single facer glue application adjusting method according to the present invention is that a glue application roll is rotated at a circumferential velocity different from that of a downstream side corrugating roll; the glue application roll is moved toward the downstream side corrugating roll to touch the downstream side corrugating roll via a core paper; after a drive torque of the glue application roll varies and comes to a predetermined value, the glue application roll is moved to the direction of separation from the downstream side corrugating roll; and when the drive torque of the glue application roll returns to the value immediately before the commencement of the variation, movement of the glue application roll is stopped so that a gap between the glue application roll and the downstream side corrugating roll is adjusted approximately to a thickness of the core paper.

Further, a feature of a single facer glue application adjusting apparatus according to the present invention is that it comprises a moving device to move a glue application roll to the direction of contact or separation relative to a downstream side corrugating roll, a detection device to detect a drive torque of the glue application roll and a control device to control work of the moving device based on a detected signal from the detection device and is so constructed that a gap between the glue application roll and the downstream side corrugating roll can be adjusted approximately to a thickness of a core paper in response to variation in the drive torque of the glue application roll.

Further feature of a single facer glue application adjusting method according to the present invention is that a glue application roll is rotated at a circumferential velocity different from or same as that of a downstream side corrugating roll; the glue application roll is moved toward the downstream side corrugating roll to touch the downstream side corrugating roll via a core paper; and when a pressing reaction force of the glue application roll varies, movement of the glue application roll is stopped so that a gap between the glue application roll and the downstream side corrugating roll is adjusted approximately to a thickness of the core paper.

Further feature of a single facer glue application adjusting method according to the present invention is that a glue application roll is rotated at a circumferential velocity different from or same as that of a downstream side corrugating roll; the glue application roll is moved toward the downstream side corrugating roll to touch the downstream side corrugating roll via a core paper; after a pressing reaction force of the glue application roll varies and comes to a predetermined value, the glue application roll is moved to the direction of separation from the downstream side corrugating roll; and when the pressing reaction force of the glue application roll returns to the value immediately before the commencement of the variation, movement of the glue application roll is stopped so that a gap between the glue application roll and the downstream side corrugating roll is adjusted approximately to a thickness of the core paper.

Further feature of a single facer glue application adjusting apparatus according to the present invention is that it comprises a moving device to move a glue application roll to the direction of contact or separation relative to a downstream side corrugating roll, a detection device to detect a pressing reaction force of the glue application roll and a control device to control work of the moving device based on a detected signal from the detection device and is so constructed that a gap between the glue application roll and the downstream side corrugating roll can be adjusted approximately to a thickness of a core paper in response to variation in the pressing reaction force of the glue application roll.

DESCRIPTION OF THE PREFERRED EMBODIMENTS

Description is made with reference to FIGS. 1 to 4 on each example of a construction of a glue application adjusting apparatus applied to working of a single facer glue application adjusting method according to the present invention.

Figure 1:
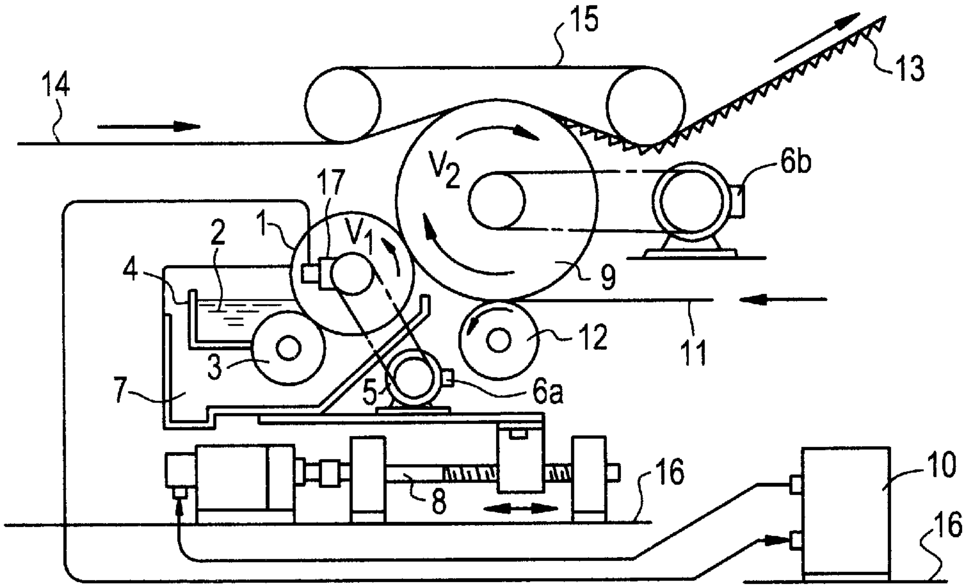
FIG. 1 is a side view showing one embodiment of a glue application adjusting apparatus (a glue application adjusting apparatus for detecting a vibration and adjusting a gap between a glue application roll and a downstream side corrugating roll) applied to working of a single facer glue application adjusting method according to the present invention.
Figure 2:
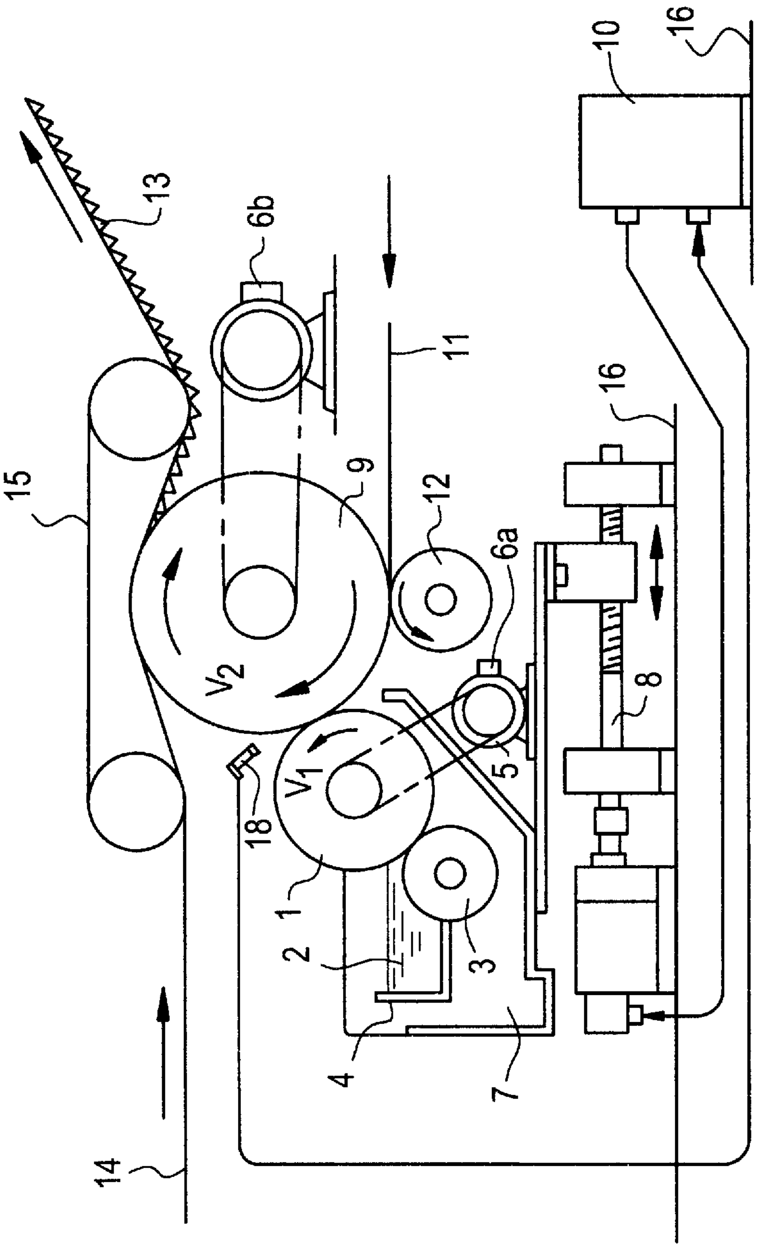
FIG. 2 is a side view showing another embodiment of a glue application adjusting apparatus (a glue application adjusting apparatus for detecting a noise and adjusting a gap between a glue application roll and a downstream side corrugating roll).
Figure 3:
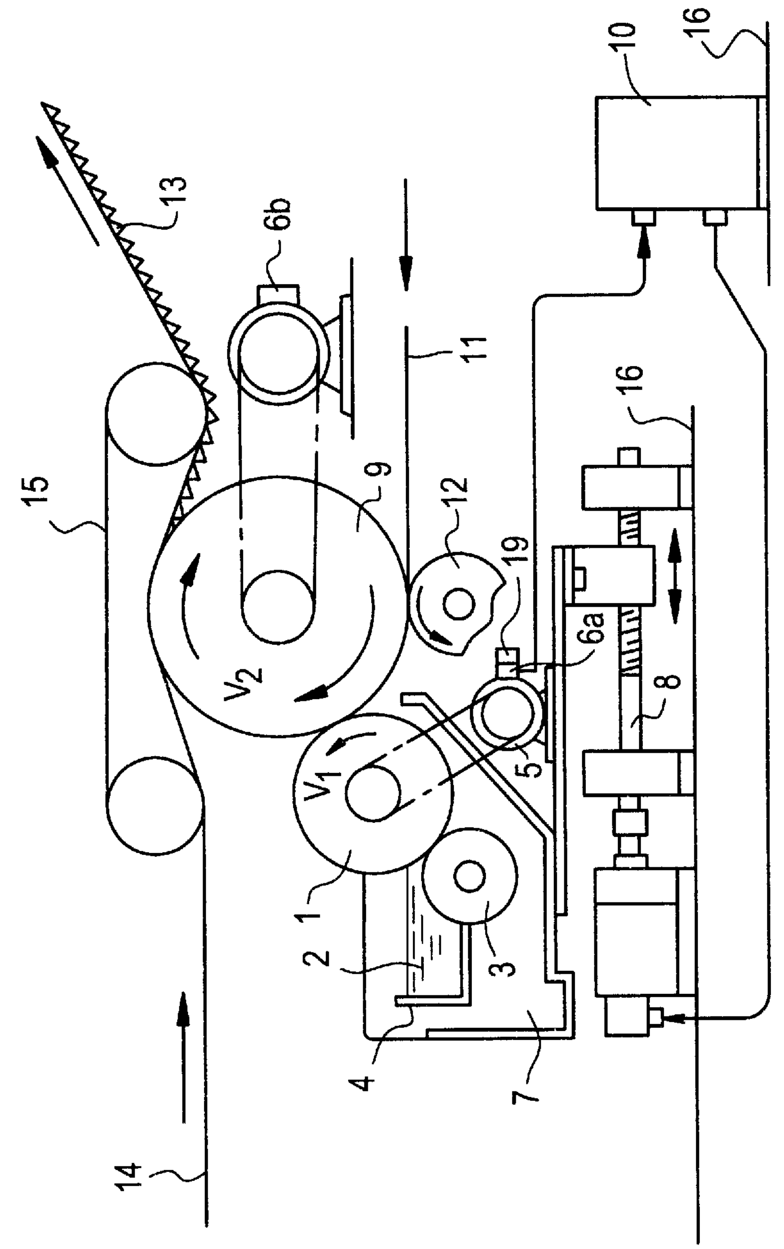
FIG. 3 is a side view showing still another embodiment of a glue application adjusting apparatus (a glue application adjusting apparatus for detecting a drive torque and adjusting a gap between a glue application roll and a downstream side corrugating roll).
Figure 4:
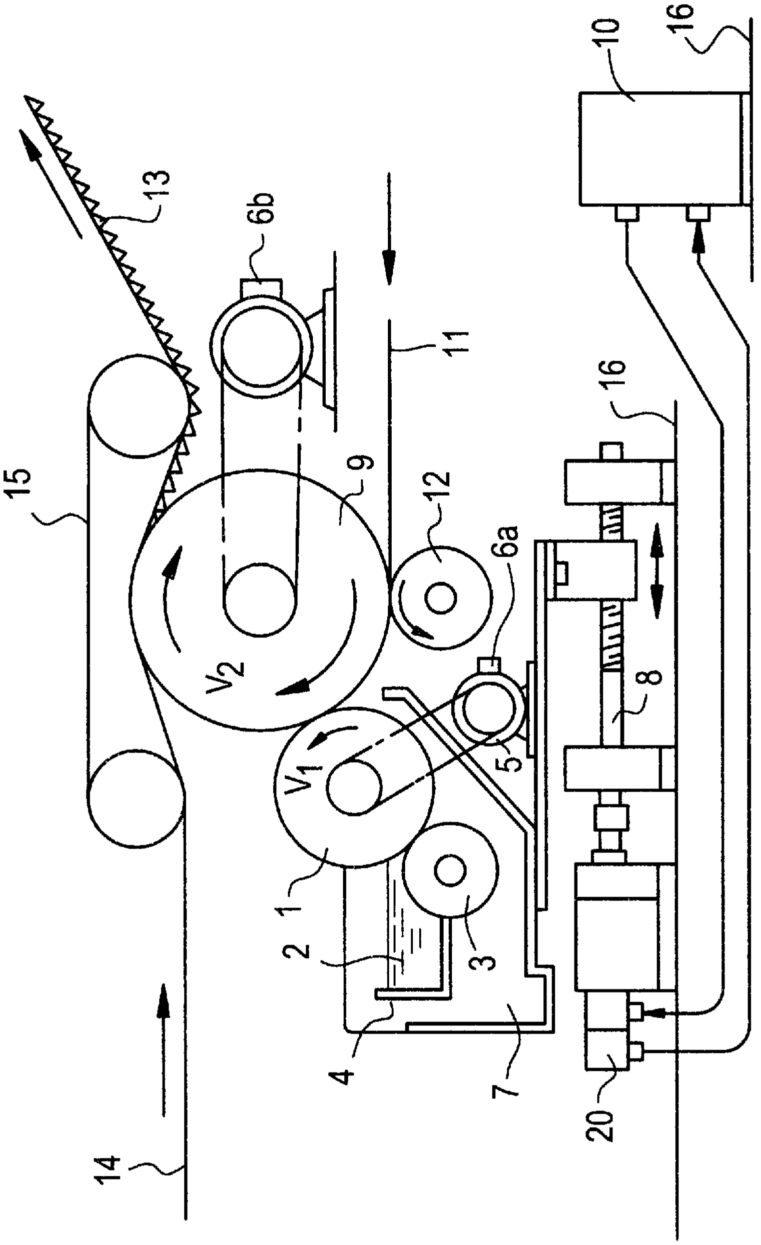
FIG. 4 is a side view showing a further embodiment of a glue application adjusting apparatus (a glue application adjusting apparatus for detecting a pressing reaction force and adjusting a gap between a glue application roll and a downstream side corrugating roll).
Figure 5:
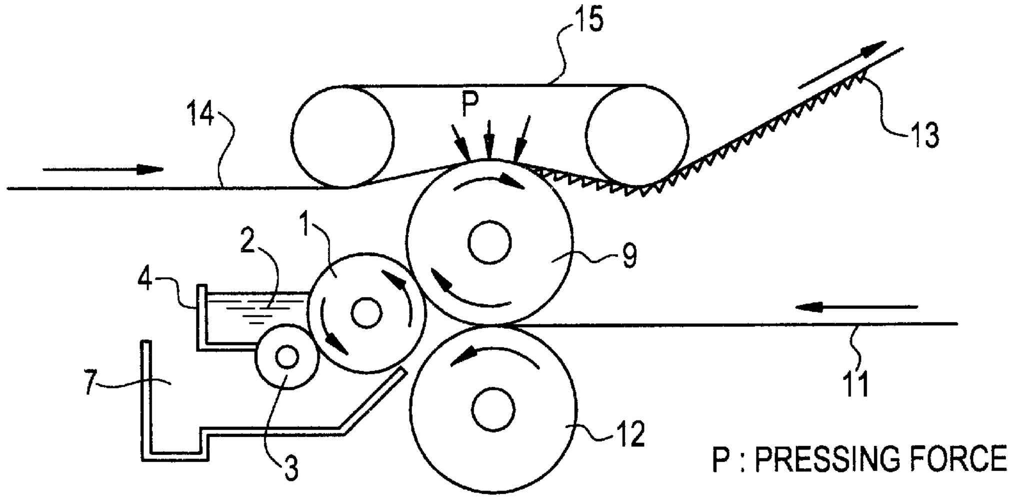
FIG. 5 PRIOR ART
FIG. 5 is a side view showing a belt pressing type single facer in the prior art.
Figure 6:
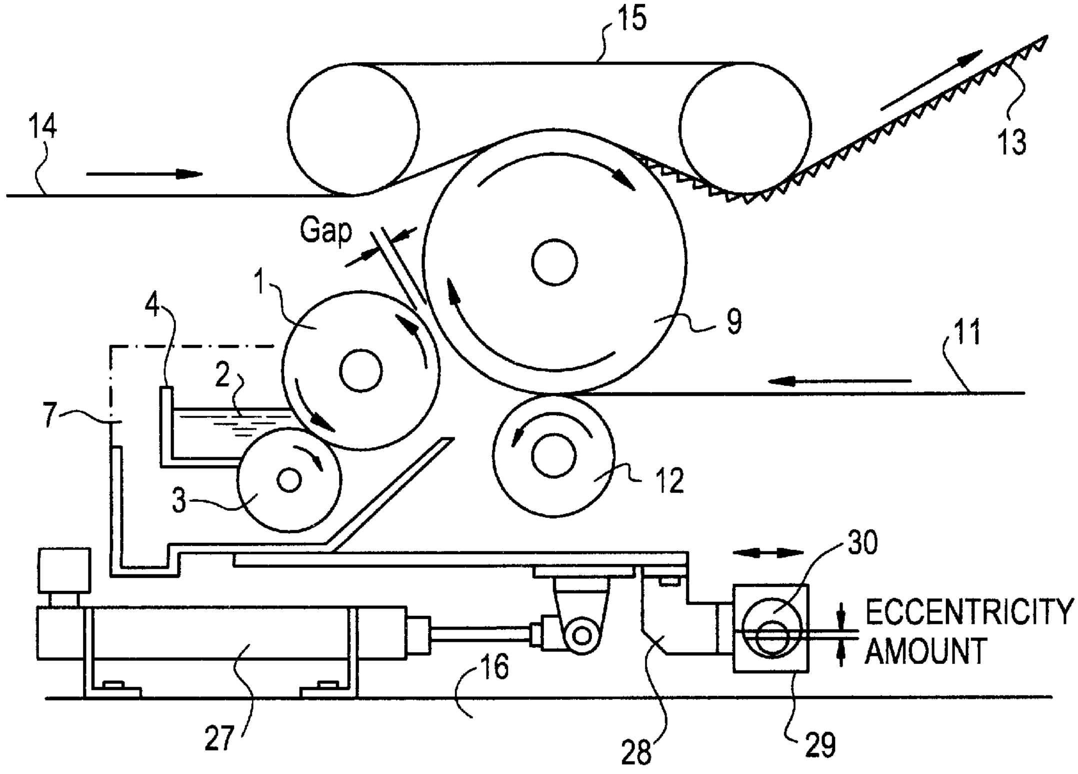
FIG. 6 PRIOR ART
FIG. 6 is a side view showing an example of a roll gap adjusting apparatus in the prior art.
Figure 7:
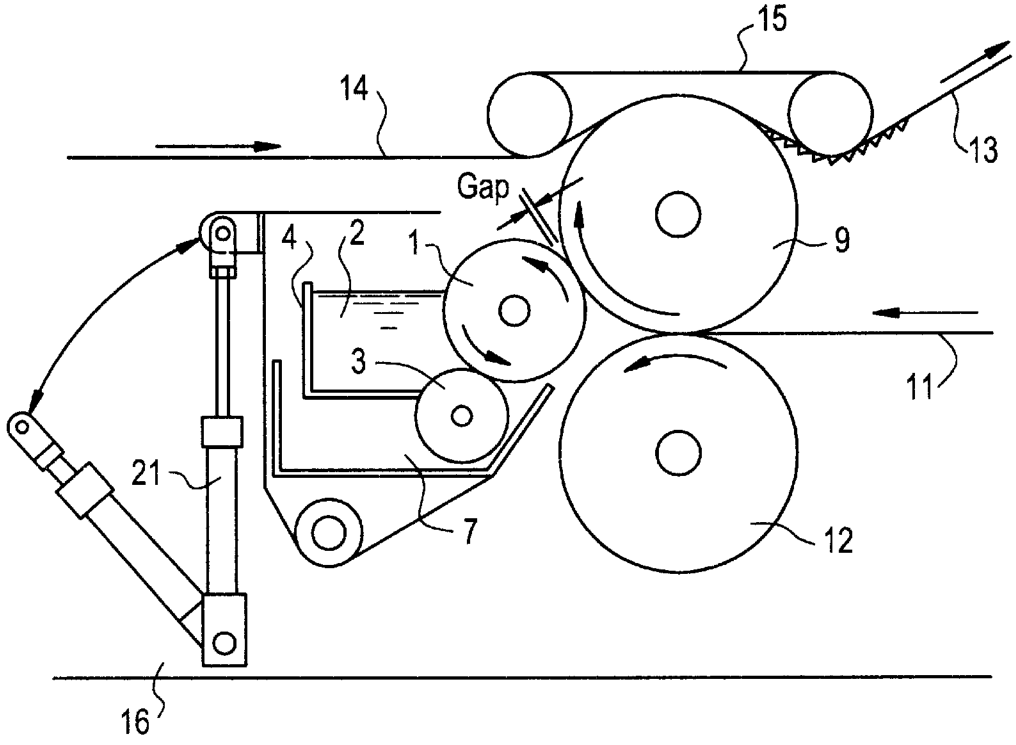
FIG. 7 PRIOR ART
FIG. 7 is a side view showing another example of a roll gap adjusting apparatus in the prior art.

FIG. 1 is a side view showing a glue application adjusting apparatus for detecting a vibration and adjusting a gap between a glue application roll and a downstream side corrugating roll, FIG. 2 is a side view showing a glue application adjusting apparatus for detecting a noise and adjusting a gap between a glue application roll and a downstream side corrugating roll, FIG. 3 is a side view showing a glue application adjusting apparatus for detecting a drive torque and adjusting a gap between a glue application roll and a downstream side corrugating roll, and FIG. 4 is a side view showing a glue application adjusting apparatus for detecting a pressing reaction force and adjusting a gap between a glue application roll and a downstream side corrugating roll.

In FIGS. 1 to 4, numeral 1 designates a glue application roll, numeral 3 designates a doctor roll, numeral 4 designates a glue tank forming a wall on one side by the glue application roll 1 and the doctor roll 3, numeral 2 designates a glue within the glue tank 4, numeral 7 designates a glue application portion unit supporting the glue application roll 1, the doctor roll 3 and the glue tank 4, numeral 9 designates a downstream side corrugating roll (an upper corrugating roll), numeral 12 designates an upstream side corrugating roll (a lower corrugating roll) contra-rotating in engagement with the downstream side corrugating roll 9, numeral 11 designates a core paper, numeral 15 designates an endless belt pressing touchingly the downstream side corrugating roll 9, numeral 13 designates a single faced corrugated board sheet, numeral 14 designates a liner, thus a glue application apparatus of a belt pressing type single facer is constructed by the glue application roll 1, the doctor roll 3 and the glue tank 4.

Numeral 5 designates a glue application roll driving motor mounted on the glue application portion unit 7 and the rotation of the glue application roll driving motor 5 is transmitted to the glue application roll 1 by a power transmitting means, such as a chain, etc. so that the glue application roll 1 is rotated.

Numeral 16 designates a frame, numeral 8 designates a moving device of the glue application portion unit 7 mounted on the frame 16, and the glue application portion unit 7 is moved to the right or left in the figure by the moving device 8 so that the glue application roll 1 makes contact with or separation from the downstream side corrugating roll 9.

Numeral 17 of FIG. 1 designates a vibration detector for detecting vibration of the portion of the glue application roll 1, numeral 18 of FIG. 2 designates a noise detector for detecting noise occurring at the engagement portion of the glue application roll 1 and the downstream side corrugating roll (upper corrugating roll) 9, numeral 19 of FIG. 3 designates a torque detector for detecting a drive torque of the glue application roll 1 and numeral 20 of FIG. 4 designates a reaction force detector for detecting a reaction force acting on the portion of the glue application roll 1.

Next is a concrete description on function of the single facer glue application adjusting apparatus shown in FIGS. 1 to 4.

The downstream side corrugating roll 9 and the upstream side corrugating roll 12 to corrugate the core paper 11 are rotated with a certain revolution corresponding to a production velocity of the single faced corrugated board sheet 13 and the circumferential velocity of the downstream side corrugating roll 9 is set at an ideal circumferential velocity $v_2$ according to specification of the core paper 11 or condition of the glue 2.

(1) Firstly, function of the glue application adjustment apparatus shown in FIG. 1 is described concretely A circumferential velocity 5, of the glue application roll 1 is set either to a different circumferential velocity or a same circumferential velocity relative to the circumferential velocity $v_2$ of the downstream side corrugating roll 9.

In this glue application adjustment apparatus, the vibration detector 17 is provided close to a bearing portion of the glue application roll 1, thus variation in the vibration of the glue application roll 1 occurring due to movement of the glue application portion unit 7 to touch the downstream side corrugating roll 9 via the core paper 11 is detected by the vibration detector 17 and the detected signal so obtained is sent to a control device 10.

In the state where the circumferential velocity $v_1$ of the glue application roll 1 is set to the above-mentioned predetermined circumferential velocity, the glue application portion unit 7 is moved to the right direction of FIG. 1 and the glue application roll 1 makes contact with the downstream side corrugating roll 9 via the core paper 11, then the vibration (amplitude, acceleration) of the glue application roll 1 varies (increases).

The vibration detector 17 detects a change in said vibration and, by the detected signal so obtained, the control device 10 adjusts and sets the position of the glue application roll 1 appropriately.

At this time, by use of the control device 10, ① when the vibration varies due to contact of the glue application roll 1, the moving device 8 is stopped so that the glue application roll, that is, the glue application portion unit 7, is fixed, or ② when the vibration varies and comes to a predetermined value, the glue application roll 1 is once moved back and when the vibration returns to the initial state, the movement of the glue application portion unit 7 is stopped so as to be fixed at said position.

(2) Next, function of a glue application adjustment apparatus shown in FIG. 2 is described concretely A circumferential velocity $v_1$ of the glue application roll 1 is set either to a different circumferential velocity or a same circumferential velocity relative to the circumferential velocity $v_2$ of the downstream side corrugating roll 9.

In this glue application adjustment apparatus, the noise detector 18 is provided close to an engagement portion of the glue application roll 1 and the downstream side corrugating roll 9, thus variation in the noise occurring due to movement of the glue application portion unit 7 to touch the downstream side corrugating roll 9 via the core paper 11 is detected by the noise detector 18 and the detected signal so obtained is sent to a control device 10.

In the state where the circumferential velocity $v_1$ of the glue application roll 1 is set to the above-mentioned predetermined circumferential velocity, the glue application portion unit 7 is moved to the right direction of FIG. 2 and the glue application roll makes contact with the downstream side corrugating roll 9 via the core paper 11, then the noise occurring at the engagement portion of the glue application roll 1 varies (increases).

The noise detector 18 detects a change in said noise and, by the detected signal so obtained, the control device 10 adjusts and sets the position of the glue application roll 1 appropriately.

At this time, by use of the control device 10, ① when the noise varies due to contact of the glue application roll 1, the moving device 8 is stopped so that the glue application roll 1, that is, the glue application portion unit 7, is fixed, or ② when the noise varies and comes to a predetermined value, the glue application roll 1 is once moved back and when the noise returns to the initial state, the movement of the glue application portion unit 7 is stopped so as to be fixed at said position.

(3) Next, function of a glue application adjustment apparatus shown in FIG. 3 is described concretely A circumferential velocity $v_1$ of the glue application roll 1 is set always to a different circumferential velocity relative to the circumferential velocity $v_2$ of the downstream side corrugating roll 9 ($v_1>v_2$ or $v_1<v_2$). This is because variation in the driven torque accompanying with the engagement of the glue application roll 1 and the downstream side corrugating roll 9 cannot be detected, if $v_1$ equals $v_2$.

In this glue application adjustment apparatus, the torque detector 19 is provided on the glue application roll driving motor 5, thus variation in the drive torque due to movement of the glue application portion unit 7 to touch the downstream side corrugating roll 9 via the core paper 11 is detected and the detected signal so obtained is sent to a control device 10. Incidentally, as the torque detector 19 in this glue application adjustment apparatus, a torque detector measuring an electric current value of the glue application roll driving motor 5, for example, is used.

In the state where the circumferential velocity $v_1$ of the glue application roll 1 is set to the above-mentioned predetermined circumferential velocity, the glue application portion unit 7 is moved to the right direction of FIG. 3 and the glue application roll 1 makes contact with the downstream side corrugating roll 9 via the core paper 11, then, by the velocity difference between the glue application roll 1 and the downstream side corrugating roll 9, the drive torque of the glue application roll driving motor 5 varies (increases or decreases).

The torque detector 19 detects a change in said drive torque and, by the detected signal so obtained, the control device 10 adjusts and sets the position of the glue application roll 1 appropriatory.

At this time, by use of the control device 10, ① when the drive torque (electric current value of the glue application roll driving motor 5) varies due to contact of the glue application roll 1, the moving device 8 is stopped so that the glue application roll 1, that is, the glue application portion unit 7, is fixed, or ② when the drive torque varies and comes to a predetermined value, the glue application roll 1 is once moved back and when the drive torque returns to the initial state, the movement of the glue application portion unit 7 is stopped so as to be fixed at said position.

(4) Next, function of a glue application adjustment apparatus shown in FIG. 4 is described concretely A circumferential velocity $v_1$ of the glue application roll 1 is set to a different circumferential velocity or a same circumferential velocity relative to the circumferential velocity $v_2$ of the downstream side corrugating roll 9.

In this glue application adjustment apparatus, the reaction force detector 20 is provided on the moving device 8 for moving the glue application roll 1 of the glue application portion unit 7 so as to make contact with or separation from the downstream side corrugating roll 9, thus variation in the reaction force occurring due to movement of the glue application portion unit 7 to touch the downstream side corrugating roll 9 via the core paper 11 is detected and the detected signal so obtained is sent to a control device 10. Incidentally, as the reaction force detector 20 in this glue application adjustment apparatus, a reaction force detector measuring an electric current value of a motor for the glue application portion unit moving device 8, for example, is used.

In the state where the circumferential velocity $v_1$ of the glue application roll 1 is set to the above-mentioned predetermined circumferential velocity, the glue application portion unit 7 is moved to the right direction of FIG. 4 and the glue application roll 1 makes contact with the downstream side corrugating roll 9 via the core paper 11, then the reaction force acting on the motor for the glue application portion unit moving device 8 varies (increases).

The reaction force detector 20 detects a change in said reaction force and, by the detected signal so obtained, the control device 10 adjusts and sets the position of the glue application roll 1 appropriately.

At this time, by use of the control device 10, ① when the reaction force (reaction force acting on the motor for the glue application portion unit moving device 8) varies due to contact of the glue application roll 1, the moving device 8 is stopped so that the glue application roll 1, that is, the glue application portion unit 7, is fixed, or ② when the reaction force varies and comes to a predetermined value, the glue application roll 1 is once moved back and when the reaction force returns to the initial state, the movement of the glue application portion unit 7 is stopped so as to be fixed at said position.

In the present invention having the construction and function as mentioned above, the detection devices, detection positions, etc. of the circumferential velocity, vibration, noise, drive torque, reaction force, etc. of the roll as the object of measurement are not limited to those described and illustrated.

Incidentally, in the preferred embodiments, "a predetermined value" of the expression "when coming to a predetermined value" may be so decided, in case of noise for example, as "noise before the glue application roll 1 makes contact (which is to be predetermined by experiments) plus variation limit value (predetermined as 3 dB, for example)". As to vibration or drive torque also, it may be so decided as "value before contact is made (which is to be predetermined by experiments) plus variation limit value (predetermined as 10% of the value before contact is made, for example)".

Further, the reason why, after the value comes to a predetermined value, it is returned to the value of the time immediately before the contact, is that, if there is a play in the pressing mechanism of the glue application roll and if the pressing mechanism is stopped upon the first contact, there is a fear that the pressing force may get loose due to the play and, therefore, the pressing mechanism is once pushed somewhat strongly so that the play disappears or there remains least influence of the play to the extent possible and a limit contact (a limit at which a narrow contact is being maintained) is seeked.

In the single facer glue application adjusting method and apparatus according to the present invention as mentioned above, the glue application roll which is in a state of rotating at a circumferential velocity different from or same as that of the downstream side corrugating roll is moved to touch the downstream side corrugating roll via a core paper, thereby 1 variation in the vibration occurring at the glue application roll, 2 variation in the noise occurring at the engagement portion of the glue application roll and the downstream side corrugating roll, 3 variation in the drive torque of the glue application roll or 4 variation in the pressing reaction force occurring at the glue application roll is detected by a detecting device and a setting position of the glue application roll is adjusted based on the detected signal so obtained, thus the gap between the glue application roll and the downstream side corrugating roll can be maintained approximately at the thickness of the core paper, and even in a case of change of thickness of the core paper accompanying with change of orders, a gap adjustment by manual operation can be made unnecessary and occurrence of defective sheet accompanying with operation mistake like negligence of setting change etc. can be prevented.

Further, even in a case of change of thickness of core paper in process of production, the gap between the glue application roll and the downstream side corrugating roll can be automatically adjusted, glue transfer can be done always ideally and appearance of corrugated board sheets can be improved as well as quality of strength etc. can be enhanced.

And yet such device as a gap sensor etc. is not necessary, construction can be simplified and manufacturing cost of a glue application adjusting apparatus can be decreased.

In the present invention, vibration, noise, torque or pressing reaction force is employed as the detection value, thereby as compared with the case where other detected values like the circumferential velocity of the glue application roll etc. are employed, measurement of the detection value and control based thereon become facilitated and accuracy thereof is enhanced.

Further, in the method in which the circumferential velocity of the glue application roll is used as the detection value, there is a need to employ a slip mechanism in which the circumferential velocity varies (that is, the ratio of the circumferential velocities of the glue application roll and the downstream side corrugating roll varies) when the glue application roll makes contact with the core paper and hence the glue application roll and the downstream side corrugating roll cannot be connected each other by a mechanical power transmission means of a fixed velocity ratio, while, in the present invention, it becomes possible that the glue application roll and the downstream side corrugating roll are connected by a power transmission means of a fixed velocity ratio as mentioned above.

While a principle of the present invention has been described above in connection with preferred embodiments of the invention, it is intended that all matter contained in the above description and illustrated in the accompanying drawings shall be interpreted to be illustrative and not in a limiting sense.

What is claimed is:

1. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll, comprising the steps of: moving said glue application roll toward said downstream side corrugating roll to touch said downstream side corrugating roll via the core paper; sensing vibration of said glue application roll, and stopping movement of said glue application roll in response to varying of sensed vibration so that a gap between said glue application roll and said downstream side corrugating roll is adjusted approximately to a thickness of the core paper.

2. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll comprising the steps of: sensing vibration of said glue application roll, moving said glue application roll toward said downstream side corrugating roll to touch said downstream side corrugating roll via the core paper in response to sensing varying of the vibration and coming to a predetermined value, moving said glue application roll to the direction of separation from said downstream side corrugating roll; and in response to sensing the vibration of said glue application roll returning to the value of the time immediately before the commencement of varying, stopping movement of said glue application roll so that a gap between said glue application roll and said downstream side corrugating roll is adjusted approximately to a thickness of the core paper.

3. A single facer glue application adjusting apparatus for adjusting a position of a rotating glue application roll with respect to a downstream side corrugating roll in a single facer which corrugates a core paper in engagement with an upstream side corrugating roll, comprising a moving device to move said glue application roll to the direction of contact or separation relative to said downstream side corrugating roll, a detection device to detect a vibration state of said glue application roll and a control device to control work of said moving device based on a signal from said detection device, and being so constructed that in response to said signal indicating a change of vibration state as said glue application roll is moved a gap between said glue application roll and said downstream side corrugating roll is adjusted approximately to a thickness of the core paper in response to variation in the vibration of said glue application roll.

4. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll comprising the steps of: moving said glue application roll toward said downstream side corrugating roll to touch said downstream side corrugating roll via the core paper, sensing noise at an engagement portion of said glue application roll and said downstream side corrugating roll, and stopping movement of said glue application roll in response to a varying of sensed noise so that a gap between said glue application roll and said downstream side corrugating roll is adjusted approximately to a thickness of the core paper.

5. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll, comprising the steps of: sensing noise at an engagement portion of said glue application roll and said downstream side corrugating roll, moving said glue application roll toward said downstream side corrugating roll to touch said downstream side corrugating roll via the core paper in response to sensing varying of noise of said glue application roll and the noise coming to a predetermined value, moving said glue application roll to the direction of separation from said downstream side corrugating roll; and in response to sensing the noise of said glue application roll returning to the value of the time immediately before the commencement of variation, stopping movement of said glue application roll so that a gap between said glue application roll and said downstream side corrugating roll is adjusted approximately to a thickness of the core paper.

6. A single facer glue application adjusting apparatus for adjusting a position of a rotating glue application roll with respect to a downstream side corrugating roll in a single facer which corrugates a core paper in engagement with an upstream side corrugating roll, comprising a moving device to move said glue application roll to the direction of contact or separation relative to said downstream side corrugating roll, a detection device to detect a noise of said glue application roll and a control device to control work of said moving device based on a signal from said detection device, and being so constructed that in response to said signal being indicative of a change in noise as said glue application roll is moved a gap between said glue application roll and said downstream side corrugating roll is adjusted approximately to a thickness of the core paper in response to variation said signal indicating a change of state in the noise of said glue application roll.

7. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from a circumferential velocity of said downstream side corrugating roll comprises the roll comprises the steps of: moving said glue application roll toward said downstream side corrugating roll to touch said downstream side corrugating roll via the core paper; detecting when a drive torque of said glue application roll varies and stopping movement of said glue application roll in response to said detecting of varying drive torque so that a gap between said glue application roll and said downstream side corrugating roll is adjusted approximately to a thickness of the core paper.

8. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from a circumferential velocity of said downstream side corrugating roll comprising the step of: sensing drive torque of said glue application roll, moving said glue application roll toward said downstream side corrugating roll to touch said downstream side corrugating roll via the core paper; in response to sensing the drive torque varying and reaching to a predetermined value, moving said glue application roll to the direction of separation from said downstream side corrugating roll; and in response to sensing when the drive torque of said glue application roll returns to the value of the time immediately before the commencement of varying, stopping movement of said glue application roll so that a gap between said glue application roll and said downstream side corrugating roll is adjusted approximately to a thickness of the core paper.

9. A single facer glue application adjusting apparatus for adjusting a position of a rotating glue application roll with respect to a downstream side corrugating roll in a single facer which corrugates a core paper in engagement with an upstream side corrugating roll, comprising a moving device to move said glue application roll to the direction of contact or separation relative to said downstream side corrugating roll, a detection device to detect a drive torque of said glue application roll and a control device to control work of said moving device based on a signal from said detection device, and being so constructed that in response to said signal being indicative of a change in drive torque as said glue application roll is moved a gap between said glue application roll and said downstream side corrugating roll is adjusted approximately to a thickness of the core paper in response to variation in the drive torque of said glue application roll.

10. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll comprising the steps of: moving said glue application roll is moved toward said downstream side corrugating roll to touch said downstream side corrugating roll via the core paper sensing pressing reaction force of said glue application roll, and in response to the pressing reaction force of said glue application roll varying from a level indicative of non-contact of said glue application roll and said downstream side corrugating roll, stopping movement of said glue application roll so that a gap between said glue application roll and said downstream side corrugating roll is adjusted approximately to a thickness of the core paper.

11. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll comprising the steps of: sensing pressing reaction force of said glue application roll, moving said glue application roll toward said downstream side corrugating roll to touch said downstream side corrugating roll via the core paper in response to sensing pressing reaction force of said glue application roll varying and coming to a predetermined value, moving said glue application roll to the direction of separation from said downstream side corrugating roll; and in response the pressing reaction force of said glue application roll returning to the value of the time immediately before the commencement of varying, stopping movement of said glue application roll so that a gap between said glue application roll and said downstream side corrugating roll is adjusted approximately to a thickness of the core paper.

12. A single facer glue application adjusting apparatus for adjusting a position of a rotating glue application roll with respect to a downstream side corrugating roll in a single facer which corrugates a core paper in engagement with an upstream side corrugating roll, comprising a moving device to move said glue application roll to the direction of contact or separation relative to said downstream side corrugating roll, a detection device to detect a pressing reaction force of said glue application roll and a control device to control work of said moving device based on a signal from said detection device, and being so constructed that in response to said signal being indicative of change of the pressing reaction force from an initial level as said glue application roll is moved a gap between said glue application roll and said downstream side corrugating roll is adjusted approximately to a thickness of the core paper in response to variation in the pressing reaction force of said glue application roll.

13. A single facer glue application adjusting method for adjusting a position of a rotating glue application roll with respect to a downstream side corrugating roll in a single facer which corrugates a core paper in engagement with an upstream side corrugating roll, wherein said glue application roll is rotated at a circumferential velocity different from or same as a circumferential velocity of said downstream side corrugating roll comprising the steps of moving said glue application roll toward said downstream side corrugating roll to touch said downstream side corrugating roll via the core paper; said method further comprising steps selected from the group consisting of:

A) sensing vibration of said glue application roll, in response to sensing varying in vibration of said glue application roll, stopping movement of said glue application roll so that a gap between said glue application roll and said downstream side corrugating roll is adjusted approximately to a thickness of the core paper;

B) sensing vibration of said glue application roll, in response to sensing varying of vibration and coming to a predetermined value, moving said glue application roll to the direction of separation from said downstream side corrugating roll and in response to sensing the vibration of said glue application roll returning to the value of the time immediately before the commencement of varying, stopping movement of said glue application roll so that a gap between said glue application roll and said downstream side corrugating roll is adjusted approximately to a thickness of the core paper;

C) sensing noise of said glue application roll, in response to sensing varying of noise of said glue application roll varies, stopping movement of said glue application roll so that a gap between said glue application roll and said downstream side corrugating roll is adjusted approximately to a thickness of the core paper;

D) sensing noise of said glue application roll, in response to sensing varying of noise and coming to a predetermined value, moving said glue application roll to the direction of separation from said downstream side corrugating roll and in response to sensing the noise of said glue application roll returning to the value of the time immediately before the commencement of varying, stopping movement of said glue application roll so that a gap between said glue application roll and said downstream side corrugating roll is adjusted approximately to a thickness of the core paper;

E) sensing drive torque of said glue application roll, in response to varying of drive torque of said glue application roll, stopping movement of said glue application roll so that a gap between said glue application roll and said downstream side corrugating roll is adjusted approximately to a thickness of the core paper;

F) sensing drive torque of said glue application roll, in response to sensing varying of drive torque and coming to a predetermined value, moving said glue application roll to the direction of separation from said downstream side corrugating roll, and in response to sensing the drive torque of said glue application roll returning to the value of the time immediately before the commencement of varying, stopping movement of said glue application roll so that a gap between said glue application roll and said downstream side corrugating roll is adjusted approximately to a thickness of the core paper;

G) sensing pressing reaction force of said glue application roll, in response to sensing varying of the pressing reaction force of said glue application roll varies, stopping movement of said glue application roll so that a gap between said glue application roll and said downstream side corrugating roll is adjusted approximately to a thickness of the core paper; and H) sensing pressing reaction force of said glue application roll, in response to sensing varying of pressing reaction force and coming to a predetermined value, moving said glue application roll to the direction of separation from said downstream side corrugating roll, and in response to sensing the pressing reaction force of said glue application roll returning to the value of the time immediately before the commencement of variation, stopping movement of said glue application roll so that a gap between said glue application roll and said downstream side corrugating roll is adjusted approximately to a thickness of the core paper.

14. A single facer glue application adjusting apparatus for adjusting a position of a rotating glue application roll with respect to a downstream side corrugating roll in a single facer which corrugates a core paper in engagement with an upstream side corrugating roll, comprising a moving device to move said glue application roll to the direction of contact or separation relative to said downstream side corrugation roll, a detection device to detect a vibration, noise, drive torque or pressing reaction force of said glue application roll and a control device to control work of said moving device based on a signal from said detection device, and being so constructed that a gap between said glue application roll and said downstream side corrugating roll is adjusted approximately to a thickness of the core paper in response to the signal being indicative of a change in the vibration, noise, drive torque or pressing reaction force of said glue application roll as said glue application roll is moved.

* * * * *